United States Patent
Nakajima et al.

(10) Patent No.: US 8,562,144 B2
(45) Date of Patent: Oct. 22, 2013

(54) IMAGE PROJECTION DEVICE AND METHOD FOR CONTROLLING AIR-FILTER

(75) Inventors: Yoshinobu Nakajima, Kyoto (JP); Mamoru Nomoto, Osaka (JP); Masaya Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 13/098,522

(22) Filed: May 2, 2011

(65) Prior Publication Data

US 2011/0279788 A1   Nov. 17, 2011

(30) Foreign Application Priority Data

May 14, 2010   (JP) .................. 2010-111716

(51) Int. Cl.
   *G03B 21/18*   (2006.01)
(52) U.S. Cl.
   USPC .............. 353/61; 353/52; 353/57; 353/58; 362/294; 95/23
(58) Field of Classification Search
   USPC .......... 353/52, 57, 58, 61; 361/676, 678, 361/679.46, 679.48, 690, 694, 695; 362/294, 373; 349/5, 7–9; 95/1, 23
   See application file for complete search history.

(56) References Cited

U.S. PATENT DOCUMENTS

| | | | |
|---|---|---|---|
| 7,320,524 B2* | 1/2008 | Lee et al. | 353/60 |
| 7,677,962 B2* | 3/2010 | Chang | 454/184 |
| 8,317,337 B2* | 11/2012 | Watanabe | 353/61 |
| 8,322,867 B2* | 12/2012 | Komori | 353/119 |
| 2005/0254021 A1 | 11/2005 | Lee et al. | |
| 2006/0274281 A1* | 12/2006 | Shih et al. | 353/60 |
| 2007/0207721 A1 | 9/2007 | Chang | |
| 2009/0009728 A1* | 1/2009 | Liu et al. | 353/57 |
| 2010/0007856 A1* | 1/2010 | Fujisaki et al. | 353/52 |

FOREIGN PATENT DOCUMENTS

| | | |
|---|---|---|
| JP | 7-000735 | 1/1995 |
| JP | 2008-262035 | 10/2008 |
| JP | 2008-281970 | 11/2008 |
| TW | 200537236 | 11/2005 |

* cited by examiner

*Primary Examiner* — Georgia Epps
*Assistant Examiner* — Sultan Chowdhury
(74) *Attorney, Agent, or Firm* — Wenderoth, Lind & Ponack, L.L.P.

(57) ABSTRACT

An image projection device includes a replaceable air filter placed near an opening of a housing, a switcher for switching step by step a working area of the air filter, an air-speed meter for detecting a pollution level of the air filter, and a controller for controlling the switcher. When the air-speed meter detects that the pollution level of the air filter reaches a given threshold, the controller prompts the switcher to switch the working area of the air filter, and then detects a pollution level of the air filter after the switchover for determining whether or not the working area before the switchover needs to be switched.

8 Claims, 5 Drawing Sheets

IMAGE PROJECTION DEVICE AND METHOD FOR CONTROLLING AIR-FILTER

FIELD OF THE INVENTION

The present invention generally relates to an image projection device including an air-filter. More particularly, it relates to a multi-purpose and sophisticated image projection device to be used in harsh environments, particularly dusty environments, and a method for controlling the air-filter.

BACKGROUND OF THE INVENTION

Image projection devices have become popular in recent years, and this trend allows offering various service spaces to the image projection device (hereinafter sometimes referred to simply as a projector), e.g. it has been often used in a business conference room where the air is rather clean, but the device is now used not only in an indoor space but also in an outdoor space. The projector is now used in various service spaces, so that it is obliged to bear various environments. The projector thus must bear the harsh conditions in temperature, humidity, and cleanliness of air. Since the projectors have been widely used as discussed above, they encounter unexpected quality problems.

In particular, use of the projector in the air of low-grade cleanliness permits dust to enter the housing and to attach to the mechanism and components of the optical system. As a result, the brightness of the projector lowers sharply. Anti-dust measures of the projector thus become an important technical matter to be solved urgently.

Measures have been taken for this technical matter, for instance, a dust-removing filter (hereinafter referred to as an air filter) is provided to an intake/exhaust opening of the housing in order to prevent dust from entering the projector. However, air permeability of the air filter lowers with a longer-use because dust attaches to the filter member, so that the sucking and exhausting functions of the openings are degraded, which causes a controlling function of the temperature in the housing to become poor. Several ideas have been proposed for maintaining the air permeability of the air filter (e.g. refer to unexamined Japanese Patent Application Publication No. 2008-262035, unexamined Japanese Patent Application Publication No. 2008-281970, and unexamined Japanese Patent Application Publication No. H07-735). These literatures disclose the following measures: (1) a long size filter member is rolled (hereinafter referred to as a roll filter) for take-up use, and a given length is taken up every time after a predetermined time elapses. (2) An air-quantity sensor made of a heating coil or a semiconductor sensor is used for determining a pollution level, e.g. a magnitude of dust accumulation, of the filter member, and then the roll filter is taken up. (3) The filter member is replaced at given intervals as a general rule, and a pollution level, e.g. a magnitude of dust accumulation, is sensed based on a change in the rpm of a fan before the filter is replaced so that the replacing interval can be optimized.

However, use of a value related to a flow of air, such as an air-quantity, air speed, or rpm of the fan, as the means for sensing the pollution level of the filter member prohibits these measures discussed above from taking action to a change in the ambient environment which affects the flow of air. A projector placed at a low atmospheric pressure encounters a smaller air quantity and a lower air speed regardless of the pollution level of the filter member. In such a case, the roll filter is forcibly taken up even if the pollution level of the filter member is still at a lower level than a given critical condition. Other than the atmospheric pressure, a presence of some shades around the openings of the projector or a temperature/humidity inside and outside the projector also affects the air traveling through the filter member. Those factors make it difficult for the conventional methods to determine accurately the pollution level of the filter member.

SUMMARY OF THE INVENTION

An image projection device of the present invention comprises the following structural elements:
a replaceable air filter placed near an opening of a housing;
a switcher for switching a working area of the air filter step by step;
a pollution level detector for detecting a pollution level of the air filter; and
a controller for controlling the switcher.
When the pollution level detected by the detector reaches a given threshold, the controller prompts the switcher to switch the working area and for sensing a pollution level, thereby determining whether or not the working area needs to be switched.

When the detector detects that the pollution level of the working area reaches the given threshold, the foregoing structure allows the image projection device to switch the working area of the air filter for sensing a pollution level of the air filter after the switchover, so that the projection device can determine whether or not the working area needs to be switched. The image projection device thus can detect a difference in the pollution levels between before-the-switchover and after-the-switchover of the working area, and the projection device can determine an accurate pollution level free from being affected by the ambient environment of the projection device. An unwanted switchover of the working area in the air filter can be thus prevented.

The structure discussed above thus achieves a reliable image projection device usable in versatile environments.

A method for controlling an air filter of an image projection device that is formed of the following structural elements:
a replaceable air filter placed near an opening of a housing;
a switcher for switching a working area of the air filter step by step; and
a pollution level detector for detecting a pollution level of the air filter.
The method comprises the steps of:
obtaining a pollution level detected value by using the pollution level detector;
switching a working area of the air filter with a switcher when the detected pollution level reaches a given threshold;
sensing a pollution level of a working area after the switchover of the air filter; and
determining whether or not the working area before the switchover needs to be switched.

PREFERRED EMBODIMENT OF THE INVENTION

An exemplary embodiment of the present invention is demonstrated hereinafter with reference to the accompanying drawings.

Exemplary Embodiment

Figure 1:
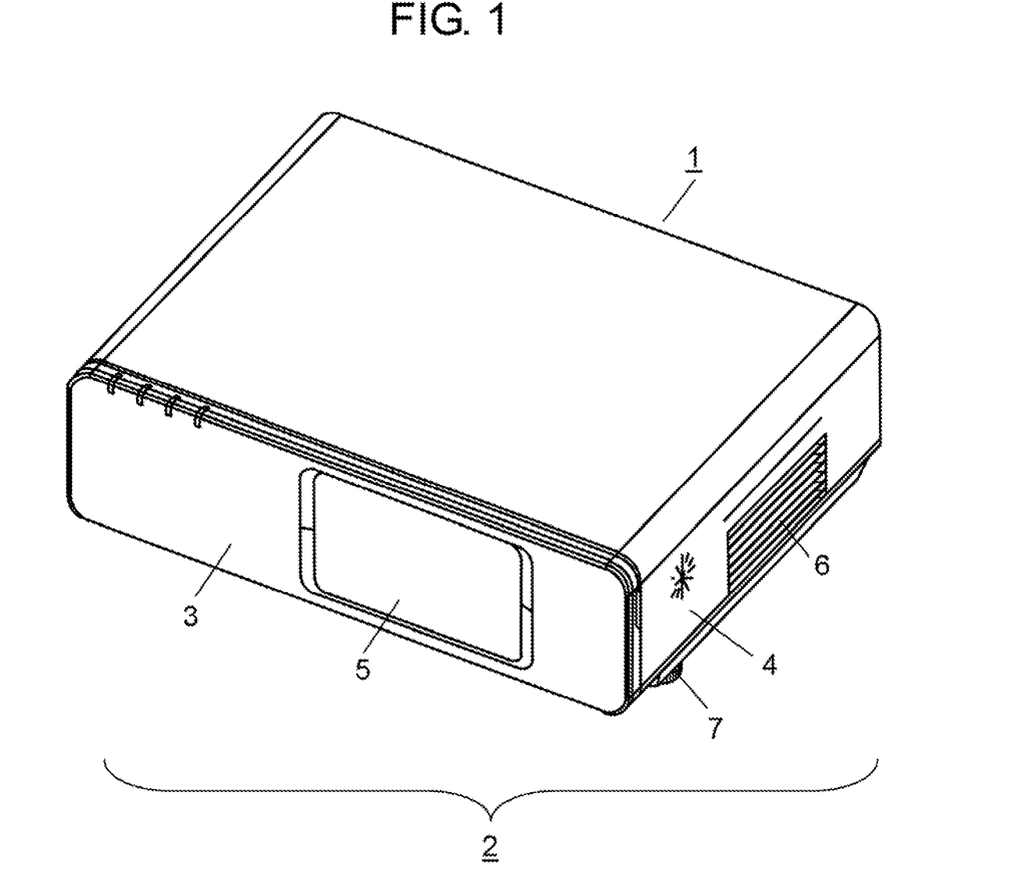
FIG. 1 is a perspective view of an external appearance of an image projection device in accordance with an embodiment of the present invention.
Figure 2:
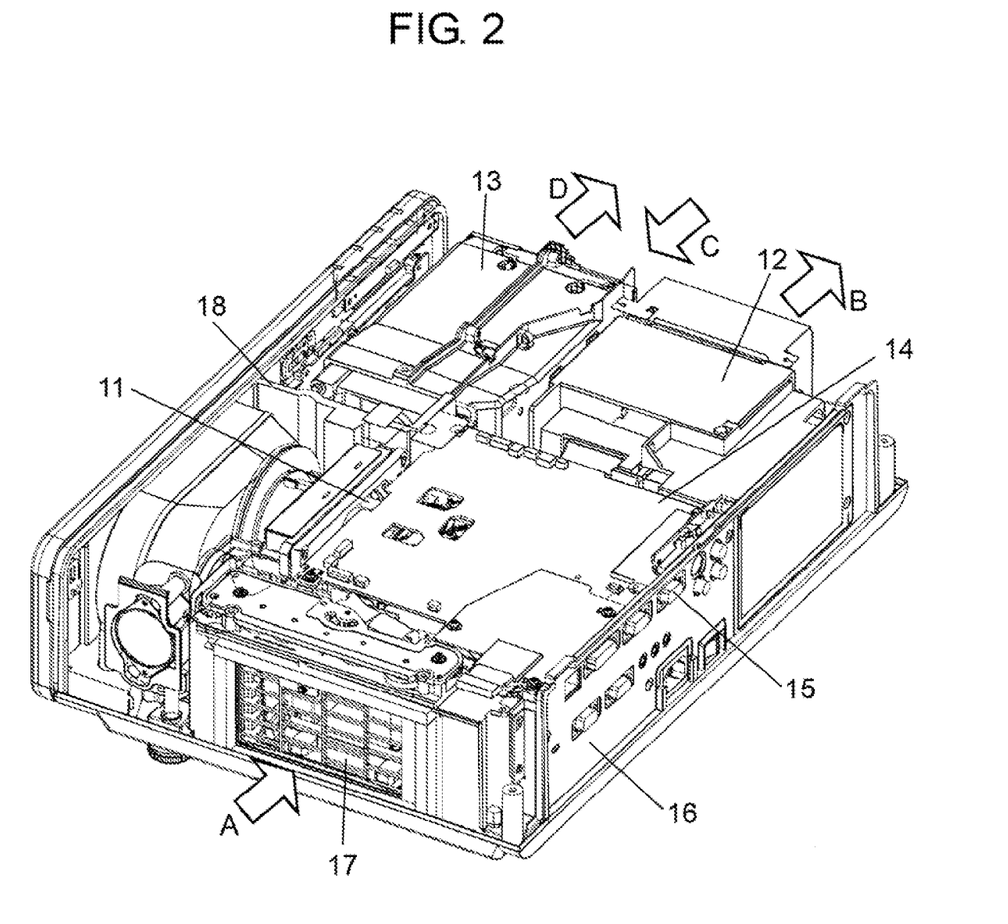
FIG. 2 is a perspective view illustrating a major structure and a placement of major components of the image projection device in accordance with the embodiment of the present invention.
Figure 3:
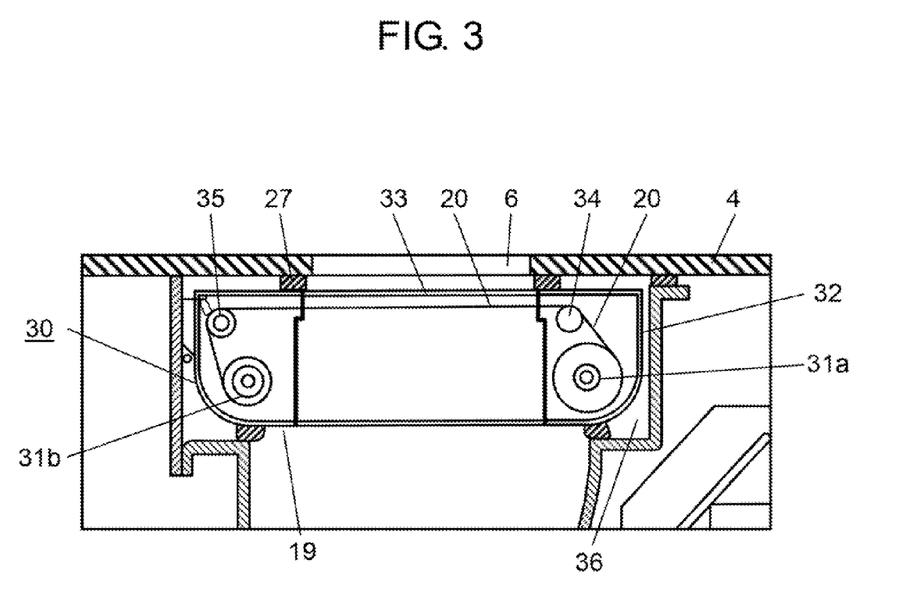
FIG. 3 is a plan view enlarging a part of the image projection device in accordance with the embodiment of the present invention for showing details of the part.

A basic structure and functions of the image projection device in accordance with the embodiment of the present invention are demonstrated hereinafter with reference to FIG. 1-FIG. 3. FIG. 1 is a perspective view of an external appearance of the image projection device (hereinafter simply referred to as device 1) in accordance with the embodiment of the present invention. FIG. 2 is a perspective view illustrating a major structure and a placement of major components within device 1 in accordance with the embodiment of the present invention. FIG. 3 is a plan view enlarging a part of device 1 in accordance with the embodiment of the present invention for showing details of the part.

Housing 2 of device 1 accommodates a projector unit (not shown, and hereinafter referred to as a projector), and includes front panel 3, outer cover 4, and a bottom plate (not shown). Front panel 3 has projection window 5, vent port 6 is provided in the lateral face of outer cover 4, and legs 7 are formed on the bottom plate. The projector can project an image at a given distance, in a given size, and with a given brightness. The image supplied from the projector is projected through projection window 5 onto a screen (not shown), thereby displaying the image on the large screen. The projector is connected to an information-processing device (not shown), e.g. a personal computer, which stores information necessary for information providing service or obtains information from the outside through a communication line.

A chief structure of device 1 is demonstrated hereinafter with reference to FIG. 2 and FIG. 3. As shown in FIG. 2, lamp section 12, power supply section 13, printed circuit board 14, and optical block 11 placed under board 14 are accommodated as the projector in housing 2 of device 1. Optical block 11 includes optical components such as a condensing lens, prism, liquid crystal display, and projecting lens. Dust entering the area (hereinafter referred to as an optical area) where optical block 11 is placed will attach to the optical components, so that the brightness of the projector sharply lowers. This is why the dust-proof measures for the optical area are vitally needed.

Printed circuit board 14 is mounted with connector 15 available on the rear face of device 1 for external connection, and connector 15 is covered with rear cover 16, i.e. connector cover. Device 1 of the present invention includes two vent paths for cooling optical block 11 and lamp section 12. The two vent paths perform suction A with a fan (not shown) from suction port 17 provided on a lateral face of device 1, and run between board 14 and the bottom plate to perform exhaust B from an exhaust port (not shown) provided on another lateral face. Another suction port and another exhaust port are formed on lateral faces of the housing for cooling power supply section 13 through suction C and exhaust D.

A replaceable dust-proof filter (not shown) is provided to suction port 17 of device 1. However, a dust-proof filter is not provided to the suction port (not shown), through which suction C occurs, because a higher blowing efficiency to power supply section 13 is needed, and the elimination of the filter can reduce air resistance. Yet, this elimination is supplemented with partition plate 18 provided inside housing 2, because partition plate 18 separates the optical area from the other areas and prevents the dust from entering the optical area. The exhaust ports are not necessarily provided with dust-proof filters because the exhaust ports discharge the dust during the operation of device 1. However, the exhaust ports being provided with the filters will increase the dust-proof effect. All the openings formed on outer cover 4 except the exhaust ports are provided with dust-proof structure.

The dust-proof structure provided to the openings of device 1 is demonstrated hereinafter with reference to FIG. 3, which is a plan view detailing the vicinity of suction port 17 (shown in FIG. 2) that corresponds to vent port 6 (shown in FIG. 1) formed on the lateral face of device 1.

As shown in FIG. 3, opening 6 is formed on outer cover 4 of device 1, and filter section 19 is provided inside device 1 and near opening 6 such that it covers opening 6. Filter section 19 is formed of filter cassette 30, a filter feeding mechanism (not shown), and a filter-feeding controller (not shown).

Filter cassette 30 is formed of roller shaft 31a on which electrostatic roll-filter 20, i.e. filter member, is wound, take-up shaft 31b for taking up roll-filter 20, and cassette housing 32 for accommodating these structural elements. Cassette housing 32 has opening 33 for the air sucked from suction port 6 to flow between roller shaft 31a and take-up shaft 31b. Roll-transfer shaft 34 and filter-travel-monitoring shaft 35 are placed between roller shaft 31a and take-up shaft 31b. The foregoing structure allows filter cassette 30 to take up a given amount of filter 20 on take-up shaft 31b, so that the part of filter 20 that covers opening 33 formed between shafts 31a and 31b can be switched over to another part. Electrostatic filter 20 working as the dust-proof filter thus has its working area switched step by step.

Filter cassette 30 is detachable from cassette holder 36, and when filter cassette 30 is mounted into cassette holder 36, take-up shaft 31b is coupled to the filter-feeding mechanism (not shown) placed in housing 2. The filter-feeding mechanism works as a switcher for switching over, step by step, the working area of filter 20 accommodated in cassette 30. Take-up shaft 31b is coupled to the filter-feeding mechanism with gears when cassette 30 is mounted to holder 36, and it is driven by a driving section formed of a stepping motor or the like.

The storage space for take-up shaft 31b of cassette housing 32 is air-tightly sealed except a filter drawing port. This structure allows preventing the dust, which is accumulated on the working area that is taken up and entered into the storage space, from leaking outside the storage space, and allows replacing filter cassette 30 with another one free from scattering the dust. Cassette holder 36 is also sealed at the circumference with cushioning member 27. In this embodiment, the filter feeding mechanism and the filter take-up mechanism allow the filter member to be taken up for switching over the working area of the filter every time the projector is used. However, the method of switching the working area of the filter is not limited to this example. Any method can be employed as long as it can switch over the working area to a fresh working area every time the projector is used.

Figure 4:
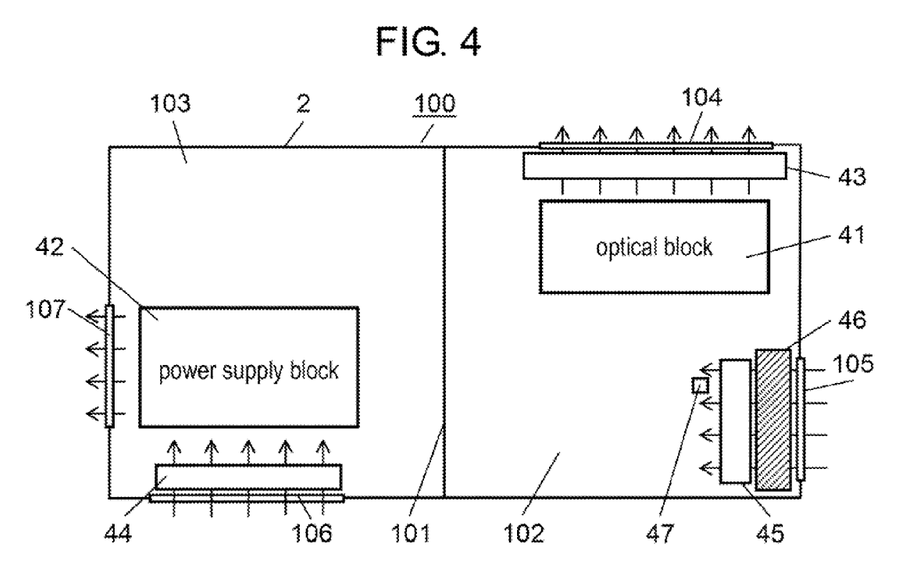
FIG. 4 is a plan view schematically illustrating a filter controlling system of the image projection device in accordance with an embodiment of the present invention.
Figure 5:
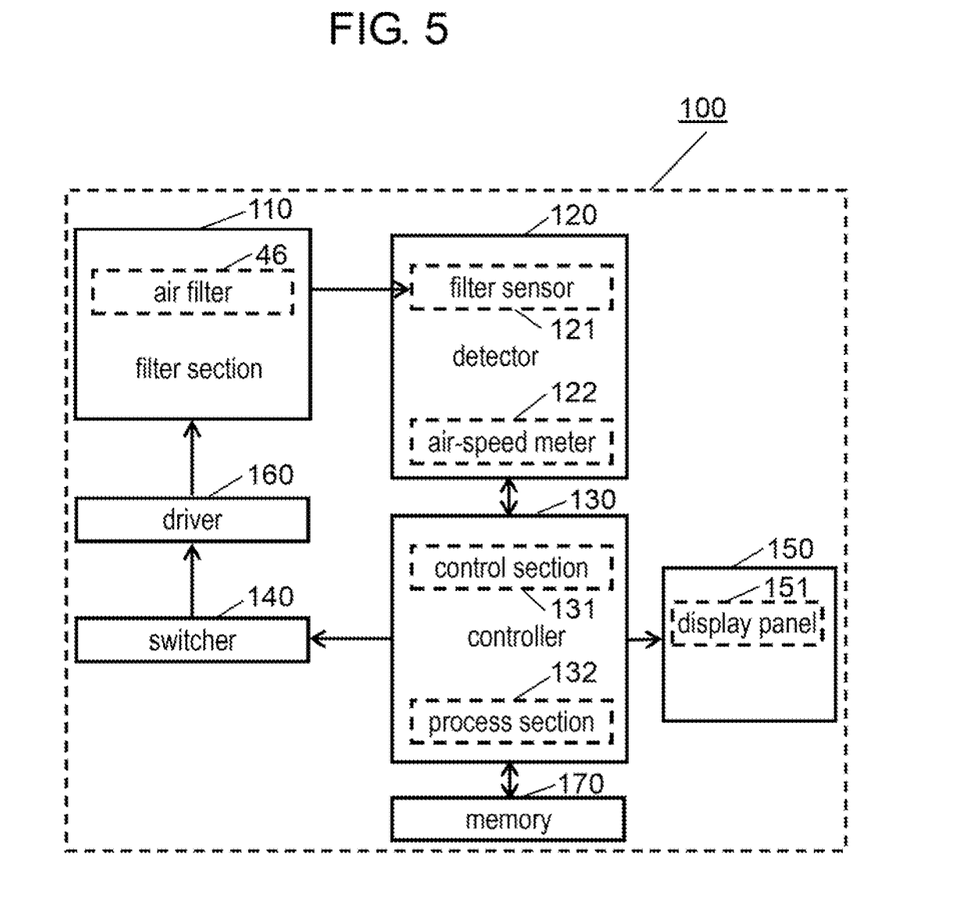
FIG. 5 is a block diagram illustrating a chief structure of the filter controlling system of the image projection device in accordance with the embodiment of the present invention.
Figure 6:
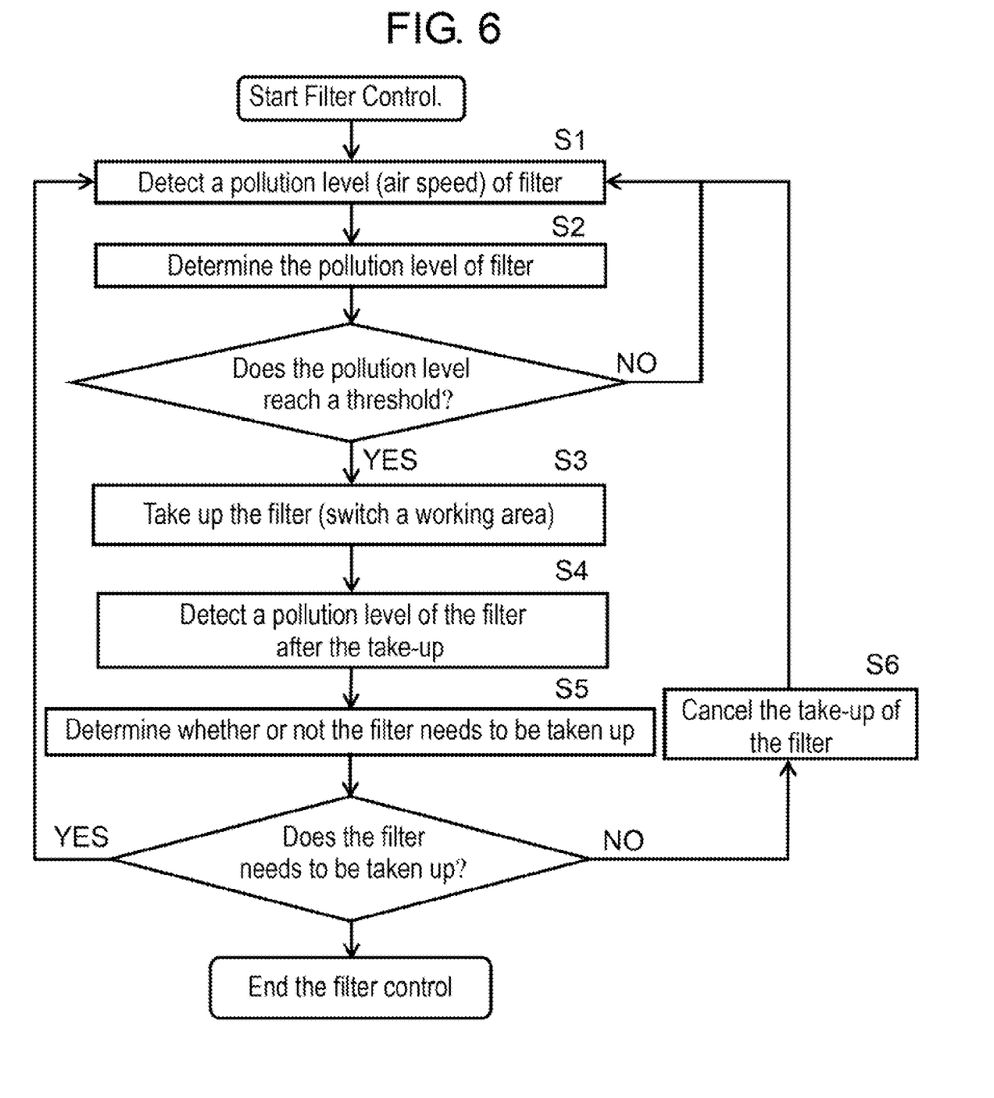
FIG. 6 is a flowchart of operating the filter controlling system of the image projection device in accordance with the embodiment of the present invention.

A filter control system, which is a functional advantage of device 1, is demonstrated hereinafter with reference to FIG. 4-FIG. 6. FIG. 4 is a plan view schematically illustrating filter control system 100 of device 1 of the present invention. FIG. 5 is a block diagram illustrating a chief structure of filter control system 100. FIG. 6 is a flowchart illustrating steps of operating filter control system 100.

A cooling mechanism of device 1 is schematically demonstrated with reference to FIG. 4. Housing 2 of device 1 is divided into two housing spaces 102 and 103 by partition wall 101. In housing space 102, optical block 41 corresponding to optical block 11 shown in FIG. 2 is placed, and power supply block 42 corresponding to power supply block 13 shown in FIG. 2 is placed in housing space 103. Housing 2 has four openings, namely, openings 104, 105, 106, and 107. Housing space 102 includes exhaust fan 43 inside opening 104 which confronts optical block 41, and housing space 102 also includes suction fan 45 inside suction opening 105 via air filter 46, which corresponds to, e.g. filter cassette 30 shown in FIG. 3.

The structure discussed above allows housing space 102, which is heated by the heat radiated from optical block 41, to receive outside air drawn by fan 45 through opening 105, and to exhaust the air heated by optical block 41 to the outside through opening 104. As a result, housing space 102 can be cooled. In a similar way, openings 106, 107, and suction fan 44 placed inside opening 106 allow supplying outside air and exhaust this air to the outside, whereby housing space 103 can be cooled. The arrows shown in FIG. 4 indicate the flows of the air.

The structure and functions of filter control system 100 are demonstrated with reference to FIG. 4 and FIG. 5. As shown in FIG. 4, dust removing filter 46 (hereinafter simply referred to as an air filter) is placed at suction port 105 (opening) of housing space 102 where optical block 41 is placed. Air filter 46 has a structure which takes up the filter member and then accommodates the taken-up filter member in the cassette. This structure has been described with reference to FIG. 3. A given length of the filter member is taken up, thereby switching step by step the working area, facing opening 105, of the filter. Filter 46 has 12 working areas available to be switched. When air filter 46 is used up, a display panel (not shown) indicates that the filter needs to be replaced. The device employing components to be replaced is equipped with a tool, e.g. LED, to inform users of the necessity to replace these components when necessary.

FIG. 5 is a block diagram illustrating chief sections of filter control system 100, which is formed of filter section 110, detector 120, controller 130, switcher 140, display 150, driver 160, and memory 170.

Filter section 110 includes air filter 46 and cassette holder 36 (shown in FIG. 3) placed in housing 2. Air filter 46 is placed near opening 105 and detachable from holder 36. The working area of air filter 46 is switched by taking up the filter member step by step for blocking dust. Cassette holder 36 holds air filter 46 at a given place, and engages filter 46 with driver 160 when filter 46 is mounted thereto.

Detector 120 includes filter sensor 121, working as a sensor of air filter 46, and air-speed meter 122 working for detecting a pollution level of filter 46. Detector 120 converts the information supplied from filter sensor 121 and air-speed meter 122, and then sends it to controller 130. Filter sensor 121 detects the presence of air filter 46 as well as how often filter 46 is taken up. Air-speed meter 122 is placed inside or outside housing 2 and uses a measured value regarding the air speed, thereby detecting the pollution level of the air filter placed near the openings of device 1. The detector for detecting the pollution level of the air filter is not limited to the air-speed meter; however, every value measured by various sensors is converted into a generalized value, i.e. a pollution level, to be used for determining a magnitude of pollution.

Controller 130 includes control section 131 and process section 132. Control section 131 controls information about transferring signals to and from detector 120, switcher 140, display 150, and memory 170. On top of that, control section 131 transmits a signal supplied from detector 120 to process section 132, and also transmits information, based on the information supplied from process section 132, to switcher 140 and display 150. Control section 131 thus issues instructions about the operation of switcher 140 and display 150. Process section 132 processes the information about the operation of switcher 140 and display 150 based on the information supplied from control section 131.

Switcher 140 generates an instruction signal based on the information supplied from controller 130 for switching over the working area of air filter 46, and transmits this instruction signal to driver 160. Display 150 includes display panel 151 and a display circuit (not shown) for displaying a state of air filter 46 in operation and a sign of replacement. Regarding the state of using air filter 46, unused amount (%) of the filter is displayed, and when all the working areas are used up, i.e. the filter needs to be replaced with a new one, the sign of requiring replacement is displayed on display panel 151.

Driver 160 controls a driving mechanism engaged with air filter 46 based on the information supplied from switcher 140 for switching over the working area of air filter 46. Memory 170 is coupled to controller 130 for storing the information handled by controller 130 and transferring information to and from controller 130.

The function of controller 130 about how to switch the working area of air filter 46 is detailed hereinafter. Controller 130 determines the progress (hereinafter referred to as a pollution level) of dust accumulation in the working area of air filter 46 based on a value (detected pollution level) measured by air speed meter 122.

The working area of air filter 46 is not switched at given time intervals, but it is determined whether or not the switchover is needed when the pollution level reaches or exceeds a given threshold, e.g. when the air speed lowers to not greater than the threshold. In a case where the determination tells the switchover is needed, the working area of air filter 46 is switched (taken up). In a case where the determination tells the switchover is not needed, the switchover is not done.

The determination whether or not the switchover is needed is done this way: when the air speed lowers to not greater than the threshold, the present working area of air filter 46 is temporarily switched over to a fresh working area, and the pollution levels of after-the-switchover and before-the-switchover, namely, the present working area and the fresh working area, are compared. Since the fresh working area is not used yet, the comparison allows determining whether or not the switchover is needed by consulting, e.g. a given table showing grades of pollution level. In a case where the comparison shows the difference in the pollution levels between after-the-switchover and before-the-switchover is not greater than the threshold, it is determined that the decrease in the air speed is not caused by the pollution, e.g. the dust accumulation, of air filter 46, but it is caused by a change in the environment, e.g. a change in the atmospheric pressure. Then the temporarily switched working area is rewound for re-use. On the other hand, in a case where the difference exceeds the threshold, it is determined that the decrease in the air speed is caused by the pollution, e.g. dust accumulation, in air filter

46. Air filter 46 is thus not rewound, but the switchover condition is kept for using the fresh working area.

Since the values measured by the air-speed meter are affected by changes in the ambient environment, e.g. atmospheric pressure, filter control system 100 of device 1 determines whether or not air filter 46 needs to be replaced, by means of sensing the values measured by the air-speed meter, thereby eliminating the influence from the changes in the ambient environment. As a result, the working area of air filter 46 can be switched over accurately and efficiently without fail, which prevents the filter member from being wasted.

Process section 132 includes a ROM (read only memory, not shown) for storing programs and data of information processing related to the switchover of a present working area to a fresh working area of air filter 46. Based on the information detected by air-speed meter 122, process section 132 thus processes the information about the foregoing switchover of the working area of air filter 46.

Filter control system 100 discussed above uses a roll-air-filter; however, a type of the air filter is not limited to this example. Any air filter for which the working area can be switched, e.g. by sliding, can be used in filter control system 100 with a similar advantage to what is discussed previously.

When an unsteady and transitional situation occurs due to a problem of ON/OFF of the light source or a problem with the power supply, control section 131 has a function of prohibiting the information about the pollution level sensed values from being transmitted to process section 132. This function allows elimination of transitional variable factors.

In a case where air filter 46 is not replaced yet, although air filter 46 needs to be replaced and the pollution level detected value reaches the threshold, controller 130 then increases the rpm of the exhaust fan in a given period as a tentative measure. This measure can strengthen the exhausting power against a drop in air permeability of air filter 46, whereby the control function over the temperature in the housing can be maintained.

Next, operation of filer control system 100 is demonstrated with reference to FIG. 6. When system 100 starts working, as shown in step S1 shown in FIG. 6, air-speed meter 122 measures, at given intervals, a speed of the air exhausted into housing space 102 via air filter 46 by suction fan 45 placed at opening 105 of housing 2. Detector 120 detects a pollution level of filter 46 by using the air speeds measured by meter 122. The detected information (pollution level detected value) is then converted and transmitted to controller 130.

In step S2, controller 130 determines a pollution level of air filter 46 based on the information supplied from detector 120. The pollution level detected value is compared with a given threshold, and when the detected value reaches or exceeds the threshold, the operation moves to step S3, and when the detected value does not reach the threshold, the operation returns to step S1.

In step S3, an instruction issued by controller 130 prompts switcher 140 and driver 160 to take up air filter 46, thereby switching over the working area to a fresh working area of the filter member, and then the operation moves to step S4.

In step S4, a pollution level of filter 46 after the take-up (i.e. the fresh working area) is detected in a similar manner to what is done in step S1, and then the operation moves to step S5. In step S4, the pollution level (air permeability) of the unused filter member at the operating site of device 1 is detected.

In step S5, the pollution level (air permeability) of the unused filter member is compared with the pollution level of air filter 46 before the take-up, thereby determining whether or not air filter 46 needs to be taken up. In other words, the difference in the pollution level detected values between before the take-up and after the take-up, i.e. between the present working area and the fresh working area, is compared with the threshold, thereby determining whether or not air filter 46 needs to be taken up (switchover of the present working area to the fresh working area). When the determination tells that filter 46 needs to be taken up, the operation returns to step S1, and the filter control operation ends. When the determination tells that filter 46 does not need to be taken up, the operation moves to step S6, where air filter 46 is rewound to the previous place, and then the operation returns to step 1 for ending the filter control operation.

As discussed above, device 1 of the present invention comprises the following structural elements:

- replaceable air filter 46 placed near opening 105 of housing 2;
- switcher 140 for switching over, step by step, the working area of air filter 46;
- air-speed meter 122 for detecting a pollution level of air filter 46; and
- controller 130 for controlling switcher 140.

When air-speed meter 122 detects that the pollution level of air filter 46 reaches a given threshold, controller 130 prompts switcher 140 to switch over the working area of air filter 46, and then detects a pollution level of a fresh working area of air filter 46 for determining whether or not the working area needs to be switched.

The foregoing structure allows device 1 to detect the difference in air permeability between the present working area and the fresh working area of filter 46, and to determine the pollution level of air filter 46. The foregoing structure thus determines accurately the pollution level air filter 46 free from being affected by the ambient environment of the projector. As a result, unwanted switchover of the working area to the fresh one of the air filter can be prevented, and the reliable image projection device usable in versatile environments is obtainable. On top of that, the method for efficiently controlling the air filter can be achieved.

The image projection device of the present invention, as discussed above, includes a replaceable air filter placed near an opening of a housing of the projection device, a switcher for switching over, step by step, a working area of the air filter, a detector for detecting a pollution level of the air filter; and a controller for controlling the switcher. When the detector detects that the pollution level reaches a given threshold, the controller prompts the switcher to switch over the present working area to a fresh working area of the air filter, and then detects a pollution level of the fresh working area of the air filter, thereby determining whether or not the present working area needs to be switched.

The foregoing structure allows implementation of the following: When the detector detects that the pollution level reaches the given threshold, the present working area of the air filter is switched, and then a pollution level of a fresh working area is detected, thereby determining whether or not the present working area needs to be switched. The pollution level can be thus determined by comparing the difference in the pollution levels between the present working area and the fresh working area of the air filter. The foregoing structure thus determines accurately the pollution level of the air filter free from being affected by the ambient environment of the image projection device. As a result, an unwanted switchover of the working area to the fresh working area of the air filter can be prevented, and the reliable image projection device usable in versatile environments is obtainable.

The image projection device of the present invention also allows rewinding the present working area of the air filter to a working position when the difference in the detected values of pollution level between the present working area and the fresh working area supposed to be used next is not greater than a given value. The foregoing structure thus allows the present working area to be kept working without a switchover even if it is detected that the pollution level reaches the threshold provided that the determination on switchover tells that an actual pollution level is not greater than the threshold. As a result, an unwanted switchover of the working area of the air filter can be prevented, so that the air filter is prevented from being wasted. An efficient use of the air filter is thus achievable.

The image projection device of the present invention employs an air-speed meter for detecting the pollution level of the air filter. When the pollution level detected by the air-speed meter becomes not greater than the threshold, the controller prompts the switcher to switch over the working area of the air filter. The foregoing structure allows detecting the pollution level of the air filter by using the value measured by the air-speed meter, thereby switching the working area of the air filter. This structure can be simply formed by using general-purpose components, so that the image projection device can be a quality product.

The image projection device of the present invention employs the filter with the following structure: The filter member is extended between two shafts placed at a given interval, and the filter member is accommodated like a cassette tape or an endless tape. The switcher drives at least one of the two shafts for taking up the filter member. This structure allows switching the working area of the filter member, and replacing the filter with ease. This structure also allows positively setting and holding the working area of the filter member.

The image projection device of the present invention employs an opening formed closely between the two shafts. This structure allows for positively and efficiently preventing dust from coming through the opening.

The method for controlling an air filter of an image projection device, which includes a replaceable air filter placed near an opening of a housing of the projection device, a switcher for switching step by step a working area of the air filter, and a pollution level detector for detecting a pollution level, e.g. a magnitude of dust accumulation, of the air filter, the method comprising the steps of:

obtaining a pollution level detected value of the air filter by using the pollution level detector;
switching over the present working area to a fresh working area of the air filter with the switcher when the pollution level detected value reaches a given threshold;
detecting a pollution level of the air filter after the switchover, i.e. a pollution level of a fresh working area; and
determining whether or not the present working area needs to be switched.

The method for controlling the air filter allows for returning the working area to a working position for reuse when a difference in the detected pollution levels between the present working area and the fresh working area is not greater than a given value.

The method for controlling the air filter uses a pollution level detected value measured by an air-speed meter, and when the detected value becomes not greater than the threshold, the method prompts the switcher to switch over the working area of the air filter.

What is claimed is:

1. An image projection device comprising:
    a replaceable air filter disposed near an opening of a housing of the image projection device;
    a switcher for switching over a present working area of the replaceable air filter to a fresh working area of the replaceable air filter in a step by step manner;
    a pollution level detector for detecting a pollution level of the replaceable air filter; and
    a controller for controlling the switcher,
    wherein when the pollution level detected by the pollution level detector reaches a given threshold value, the controller temporarily switches the present working area to the fresh working area, and compares a pollution level difference between the present working area and the fresh working area, and
    the controller determines whether or not sent working area needs to be switched to the fresh working area based on the pollution level difference between the present working area and the fresh working area.

2. The image projection device of claim 1, wherein when the pollution level difference between the present working area and the fresh working area is not greater than a given value, the temporary switch over of the present working area to the fresh working area is cancelled by reversing the switch over.

3. The image projection device of claim 1, wherein the pollution level is a measured value measured by an air-speed meter, and the controller temporarily switches the present working area to the fresh working area when the measured value is not greater than the given threshold value.

4. The image projection device of claim 1, wherein the replaceable air filter is formed of a filter member which is extended between two shafts disposed at a given interval, and the filter member is accommodated as a cassette tape or an endless tape,
    wherein the switcher drives at least one of the two shafts for taking up the filter member.

5. The image projection device of claim 4, wherein the opening is disposed near and between the two shafts.

6. A method for controlling an air filter of an image projection device, which includes a replaceable air filter disposed near an opening of a housing of the image projection device, a switcher for switching over a present working area of the replaceable air filter to a fresh working area of the replaceable air filter step by step, and a pollution level detector for detecting a pollution level of the replaceable air filter, the method comprising:
    detecting a pollution level of the replaceable air filter by the pollution level detector;
    temporarily switching over the present working area to the fresh working area when the pollution level detected by the pollution level detector reaches a given threshold value;
    comparing a pollution level difference between the present working area and the fresh working area; and
    determining whether or not the present working area needs to be switched to the fresh working area based on the pollution level difference between the present working area and the fresh working area.

7. The method of claim 6, wherein when the pollution level difference between the present working area and the fresh working area is not greater than a given value, the temporary switching over of the present working area to the fresh working area is cancelled by reversing the switching over.

8. The method of claim 6, wherein the pollution level is a measured value measured by an air-speed meter, and the present working area is switched to the fresh working area when the measured value is not greater than the given threshold value.

* * * * *